G. M. EATON.
ELECTRIC LOCOMOTIVE.
APPLICATION FILED JUNE 10, 1910.

1,162,043.

Patented Nov. 30, 1915.
7 SHEETS—SHEET 1.

WITNESSES:
C. L. Belcher
Otto S. Schairer

INVENTOR
Geo. M. Eaton
BY
Wesley G. Carr
ATTORNEY

G. M. EATON.
ELECTRIC LOCOMOTIVE.
APPLICATION FILED JUNE 10, 1910.

1,162,043.

Patented Nov. 30, 1915.
7 SHEETS—SHEET 6.

WITNESSES:
C. L. Belcher
Otto S. Schairer

INVENTOR
George M. Eaton
BY
ATTORNEY

G. M. EATON.
ELECTRIC LOCOMOTIVE.
APPLICATION FILED JUNE 10, 1910.

1,162,043.

Patented Nov. 30, 1915.
7 SHEETS—SHEET 7.

WITNESSES:
C. L. Belcher
Otto J. Schairer

INVENTOR
George M. Eaton
BY
Finley L. Carr
ATTORNEY

UNITED STATES PATENT OFFICE.

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,162,043.

Specification of Letters Patent.   Patented Nov. 30, 1915.

Application filed June 10, 1910.   Serial No. 566,134.

*To all whom it may concern:*

Be it known that I, GEORGE M. EATON, a citizen of the United States, and a resident of Wilkinsburg, in the county of Allegheny and State of Pennsylvania, have invented a new and useful Improvement in Electric Locomotives, of which the following is a specification.

My invention relates to electric locomotives, and it has for its object to provide a locomotive of exceptionally light but strong construction.

Another object of the invention is to provide means for resiliently connecting the journal boxes for the end driving axles to the locomotive frame independently of the means for resiliently supporting the said frame upon the journal boxes, so that the said axles and journal boxes may be capable of movement horizontally with respect to the main frame of the locomotive.

A further object of the invention is to so mount and support the driving motors for the end axles of the locomotive that, while the motors are resiliently supported from the main frame of the locomotive, they are capable of free movement with respect thereto and permit of the above-referred-to horizontal movements of the end axles and journal boxes with respect to the main frame.

A still further object of the invention is to provide a trussed locomotive frame to which bearings or seats for equalizing beams may be readily attached.

Other objects of the invention will more specifically appear in connection with the following detailed description of the locomotive.

Figure 1:
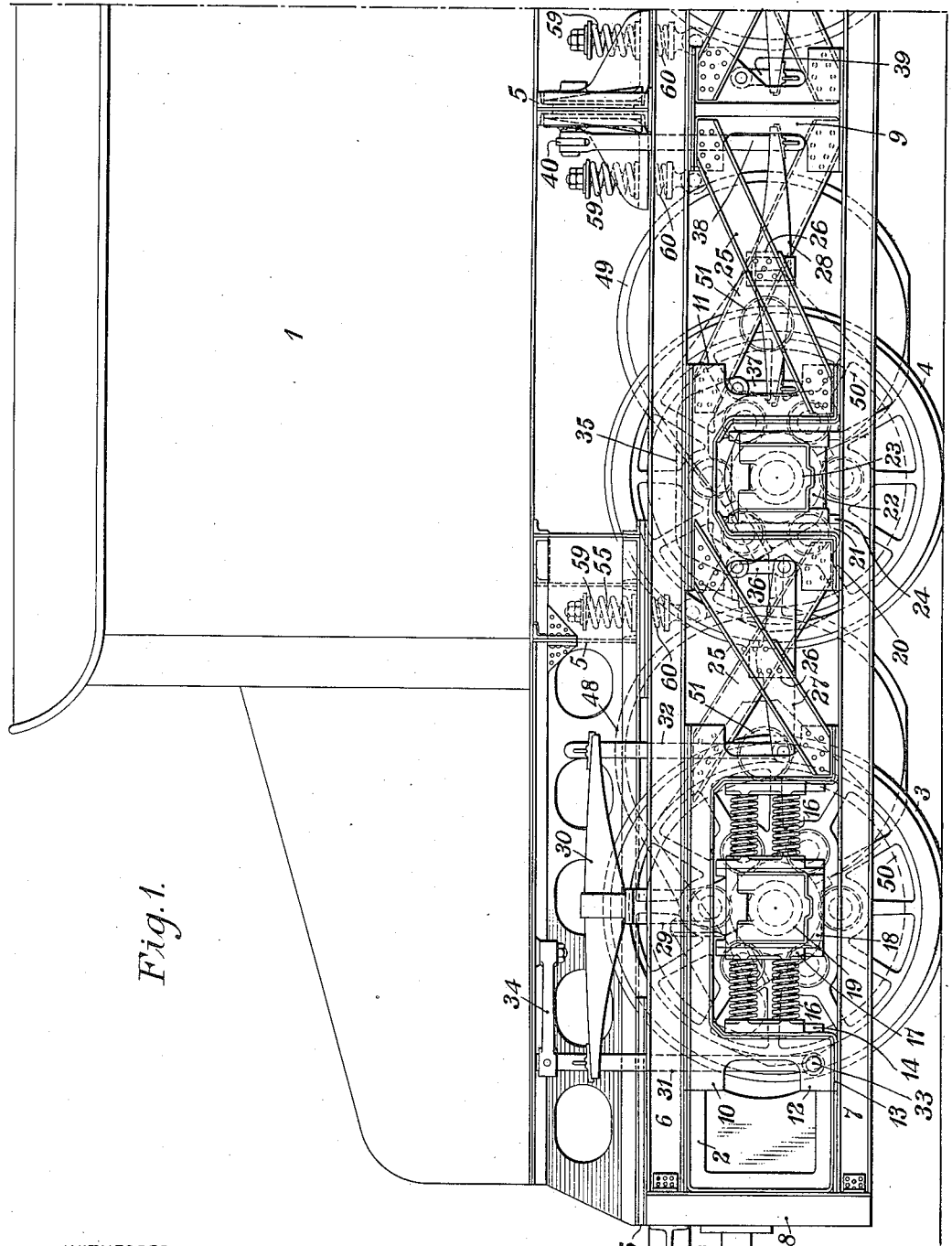
Figure 2:
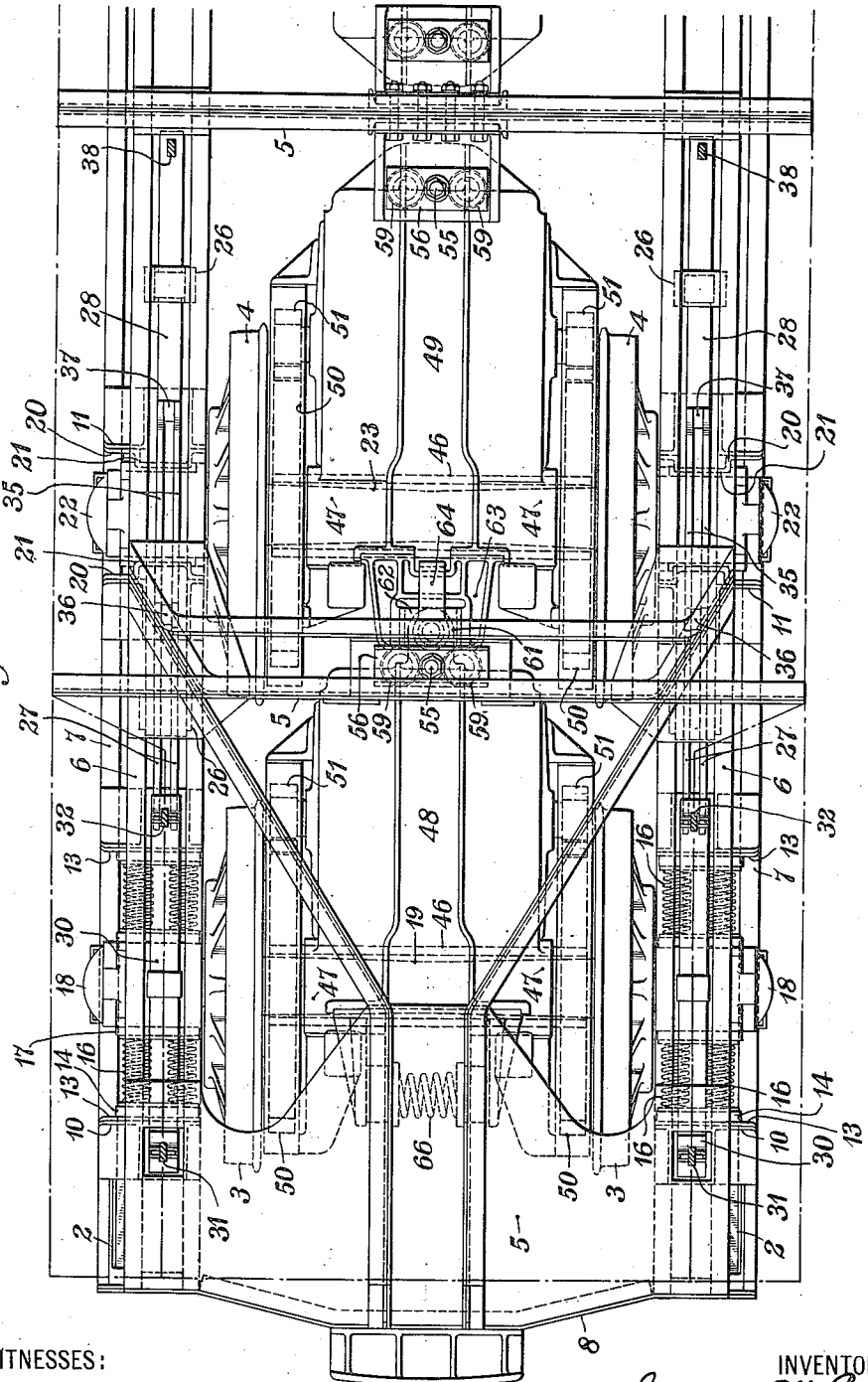
Figure 3:
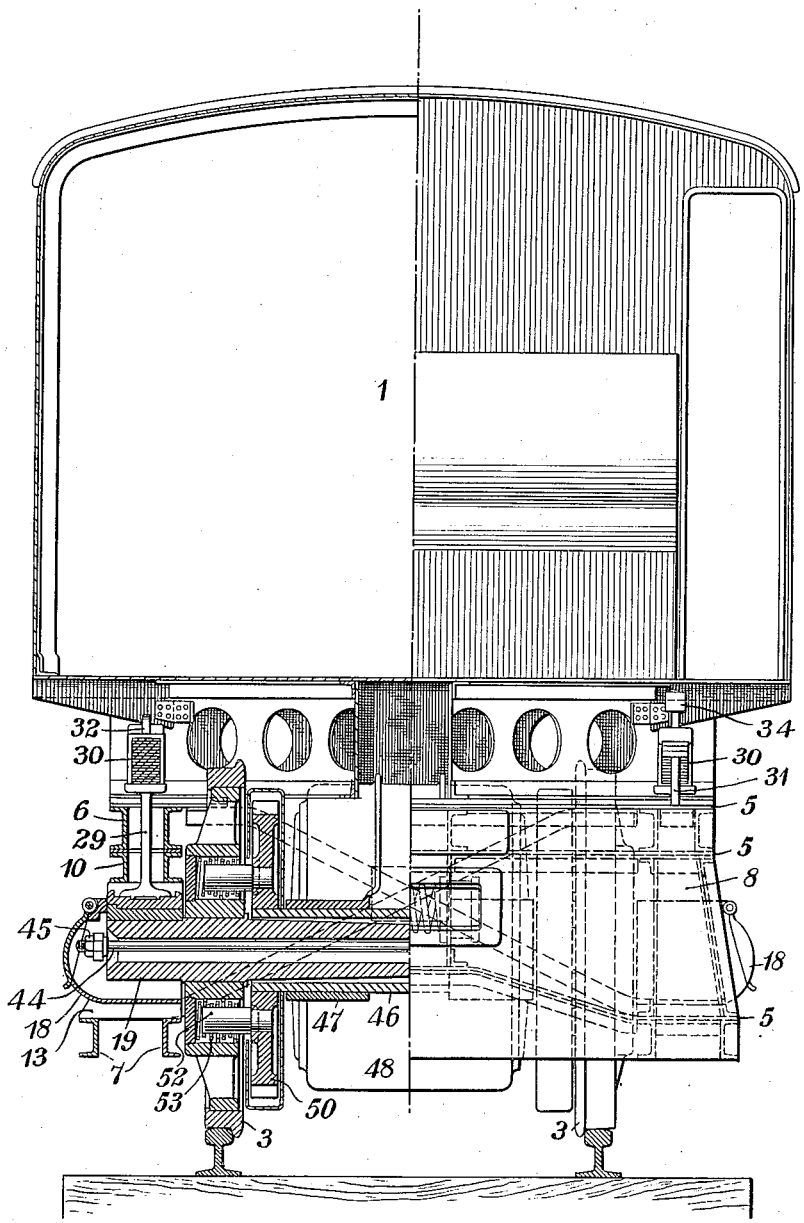
Figure 4:
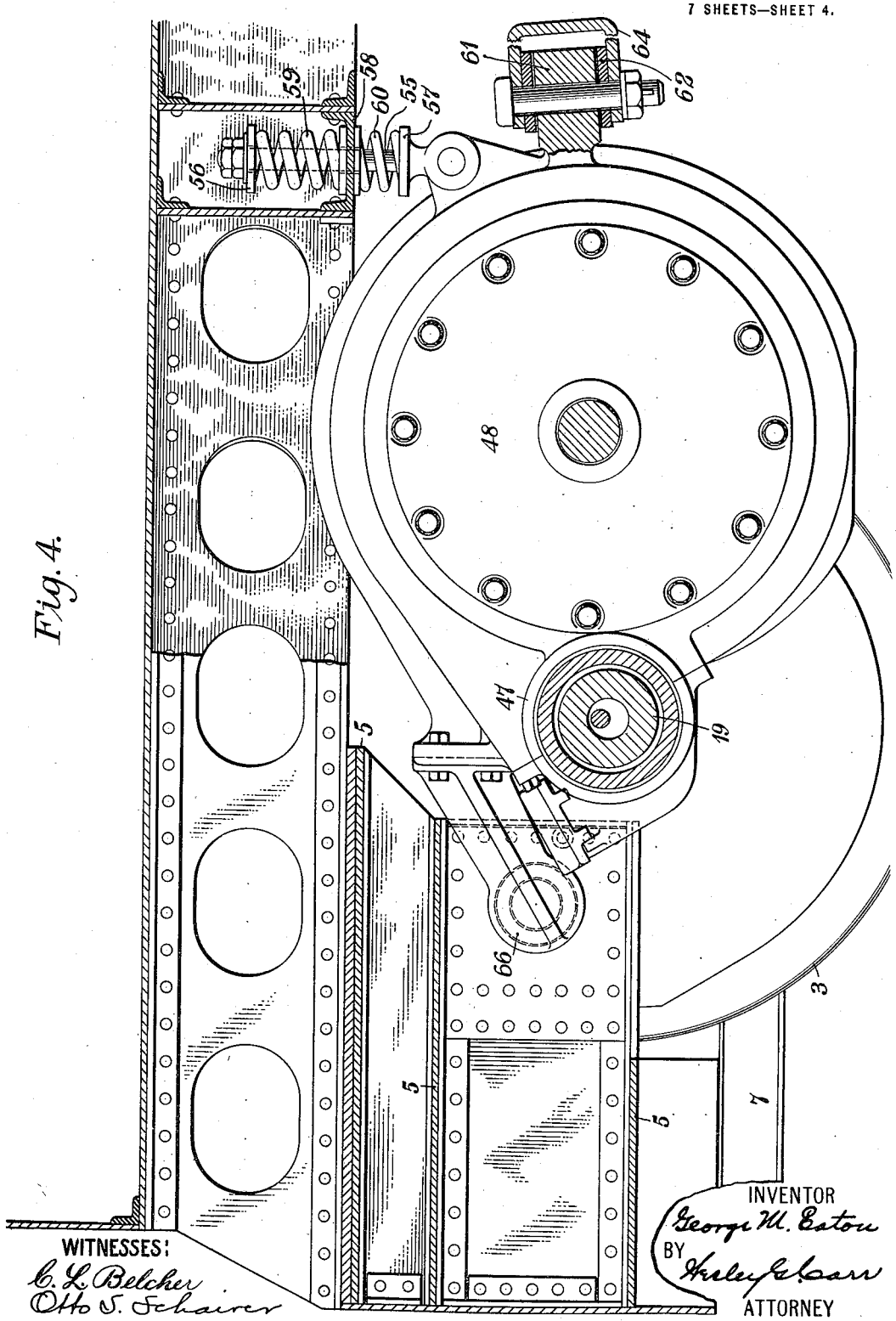
Figure 5:
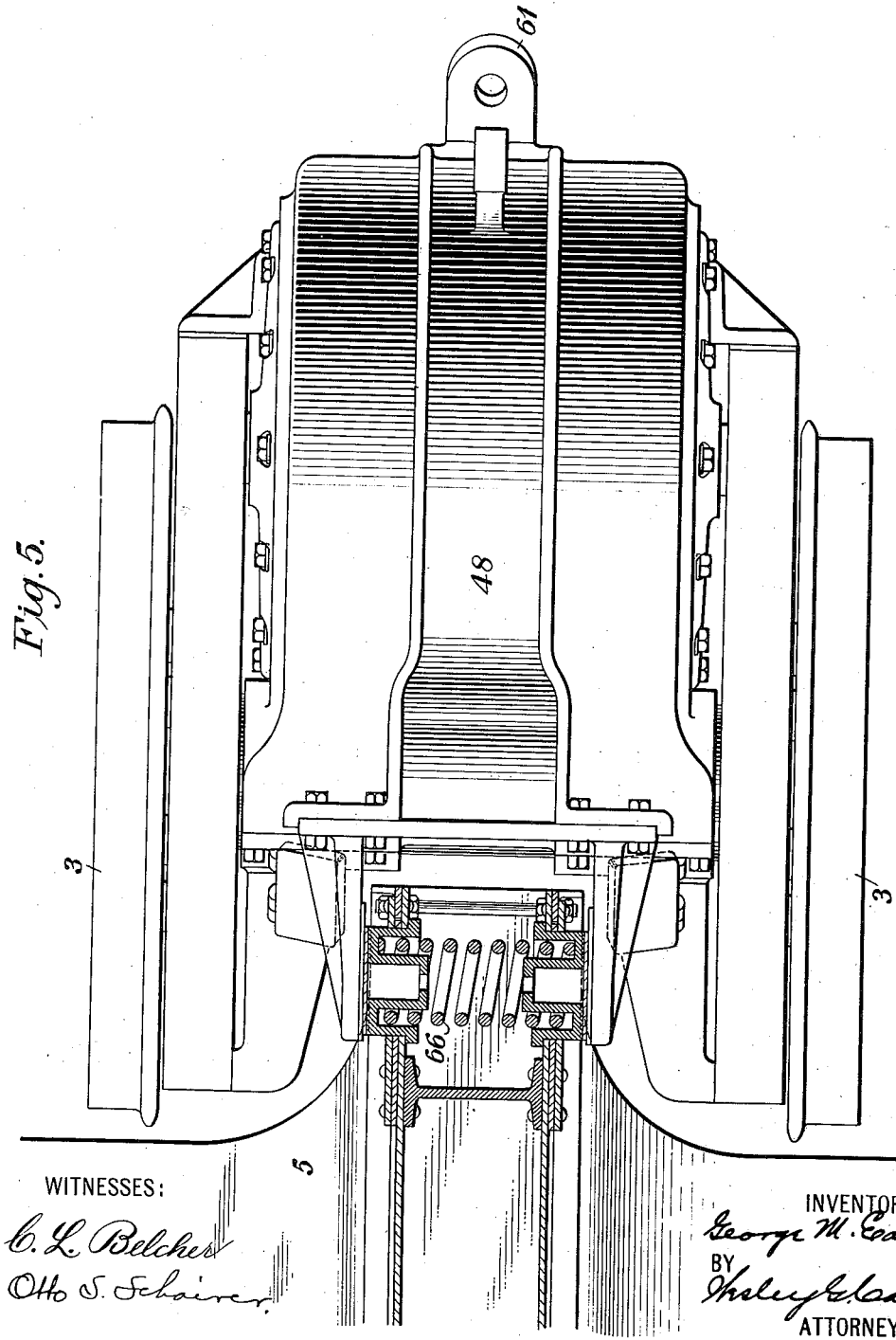
Figure 6:
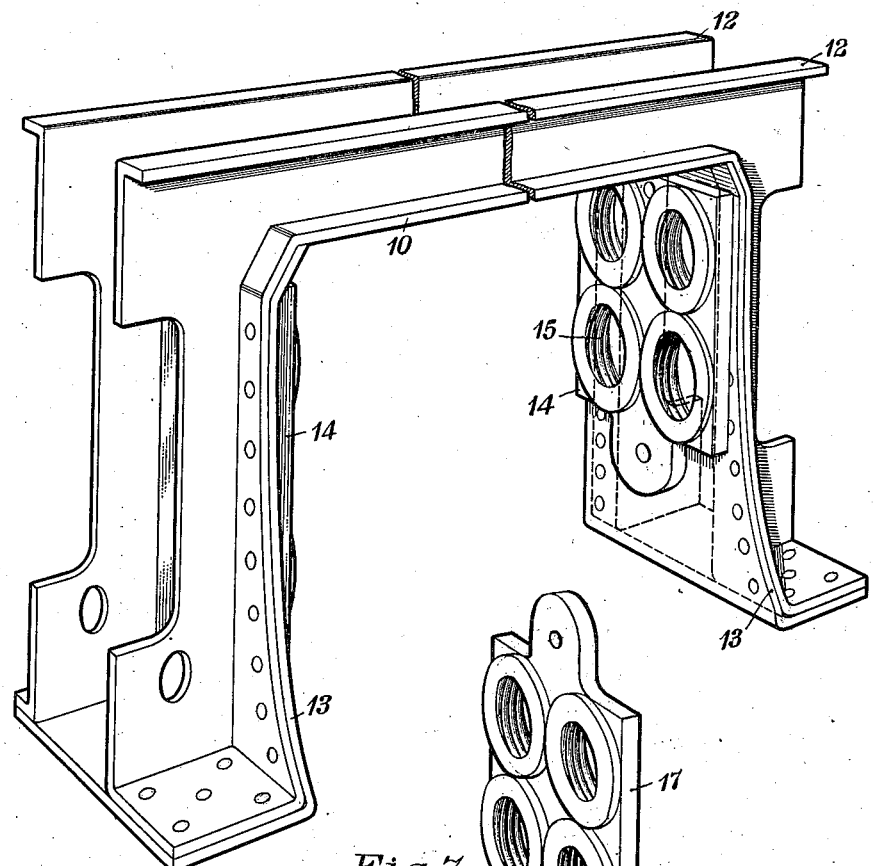
Figure 7:
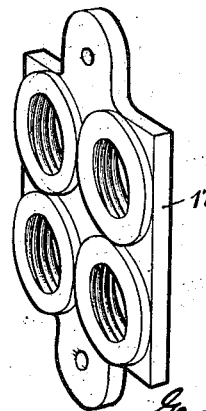
Figure 8:
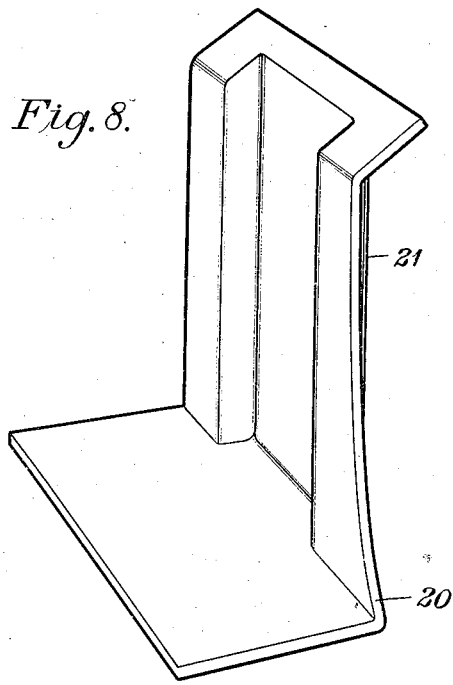
Figure 9:
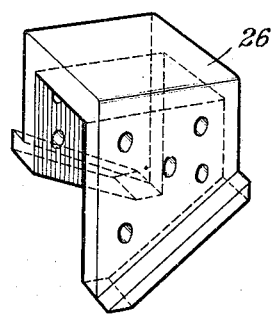

Figure 1 of the accompanying drawings is a view in side elevation of a part of a locomotive that embodies the present invention. Fig. 2 is a plan view of the truck of the locomotive shown in Fig. 1. Fig. 3 is a view in end elevation and in section of the locomotive shown in Fig. 1. Fig. 4 is an enlarged side and sectional view of a part of the locomotive, showing particularly one of the motors and its manner of support. Fig. 5 is an enlarged plan and section view of a part of the locomotive, showing particularly one of the end motors and the centering means therefor. Fig. 6 is a perspective view of one of the yokes or arches to which the end journal boxes of the locomotive are resiliently connected. Fig. 7 is a perspective view of one of the side plates for the end journal boxes. Fig. 8 is a perspective view of one of the guides for the journal boxes of the intermediate driving axles, and Fig. 9 is a perspective view of a saddle or bearing member for one of the equalizing beams of the locomotive.

The cab 1 of the locomotive is carried upon a main truck frame comprising two trussed side members 2 that are located outside of the driving wheels 3 and 4, and end and intermediate cross members 5 in the form of plates, girders and braces. The side members 2 of the main frame comprise an upper and a lower pair of channel-shaped girders 6 and 7 that are connected together by end members 8, intermediate posts 9, and arches 10 and 11, as well as by the cross members 5. Each of the arches 10 consist of two pressed steel arched members 12 that are disposed side-by-side, angle-plates 13 secured to the inner faces of the leg and foot portions of said members and plates 14 secured to the upright portions of said angle-plates and having screw-threaded apertures 15 for the reception of the ends of helical springs 16. The other ends of the springs 16 are threaded into similar apertures 15 in plates 17 that are secured to the sides of the journal boxes 18 upon the ends of axles 19, the springs 16 constituting resilient connections between the journal boxes 18 and the main frame of the locomotive, which connections permit of relative horizontal movement between the connected parts.

The arches 11 are similar to the arches 10, but do not have as great a span, and the members 20, to which the arched members 12 are secured, are provided with raised portions 21 that serve as pedestal legs or guides for journal boxes 22 upon the ends of axles 23, shoes 24 being secured to the raised portions 21 in order to protect them from wear. The journal boxes 22 are thus permitted to have a vertical movement with respect to the arches and main frame, but are not permitted to move horizontally with respect thereto.

Extending longitudinally between, and fastened at their extremities to, the arches 10 and 11, and also between the arches 11 and the posts 9 are channel-shaped lattice members 25, located between which, and attached thereto, at the point of crossing, are saddles 26 (Fig. 9) that serve as seats or bearings for the middle or intermediate points of equal beams 27 and semi-elliptic springs 28.

Bearing upon the journal boxes 18 are posts 29 that support, at their centers, semi-elliptic springs 30 upon the ends of which suspension bars or rods 31 and 32 have bearings, the lower ends of the suspension rods 32 being connected to the equal beams 27. The lower ends of the suspension rods 31 are pivotally connected to the main frame of the locomotive by means of pins 33 that extend between the pressed steel members 12 of the arches 10. The suspension rods 31 extend somewhat above the semi-elliptic springs 30, and are connected, at their upper ends, to the ends of links 34 that are, in turn, pivotally connected at their other ends to the cab 1, or to any other suitable part of the locomotive that is immovable with respect to the lower ends of the suspension rods 31.

Supported upon the journal boxes 22 are dolphin bars 35 that are connected, at their extremities, by means of links 36 and 37, respectively, to the equal beams 27 at the ends opposite the connections of the suspension bars 32 thereto, and to the extremities of the semi-elliptic springs 28. The other extremities of the semi-elliptic springs 28 have bearings for the lower ends of suspension rods 38 and 39. The two ends of the locomotive differ from each other only in the matter of equalization, which can be best explained at this point.

The suspension rods 38 of one-half of the locomotive are connected, at their upper ends, to the opposite extremities of an equalizing lever 40 that is pivoted, at its middle point, to the main frame of the locomotive. The suspension rods 39 of the other half of the locomotive, only a small portion of which is shown, are connected directly to the locomotive frame, the rods 39 being shorter than the bars 38. Thus, the effect of a three-point support of the locomotive frame upon the driving axles is obtained, one point of the support being above the driving wheels 3 and 4 at the end of the locomotive that is completely shown in Figs. 1 and 2, and the other two points of support being at the sides of the locomotive above the two pairs of driving wheels at the opposite end of the locomotive, only a small portion of which is shown.

The driving wheels 3 and 4 are mounted upon the axles 19 and 23, respectively, which are hollow and through which extend tie rods 44 having threaded extremities for the reception of nuts 45, the journal boxes at the extremities of the axles being thus tied together, so that, upon the occurrence of longitudinal or horizontal movement of the axle, the journal boxes will move therewith. This feature is covered in an application Serial No. 537,244, filed Jan. 10, 1910, by Hans G. Berensten and assigned to the Westinghouse Electric & Manufacturing Company.

The axles 19 and 23 are surrounded by quills 46 for which bearings 47 are provided in the sides of propelling motors 48 and 49 that are operatively connected thereto by means of gears 50 and pinions 51. The outer faces of the gears 50 are provided with studs 52 that project into sockets in the driving wheels and are surrounded by helical springs 53, adjacent convolutions of which are eccentrically disposed with respect to each other, as set forth in Patent No. 817,133. The motors are supported at the sides or ends opposite the bearings 47 by means of hanger rods 55 that are provided near their ends with seats 56 and 57, between which and supports or brackets 58 on the main frame, are interposed helical compression springs 59 and 60. The motor 48 is also provided, at the end opposite the bearings 47, with an apertured lug 61 having a pivotal connection to a box 62 that fits in and is capable of movement both vertically and longitudinally of the locomotive in a vertically slotted bracket 63 that is fastened to the adjacent end of the motor 49. The motor 48 is thus permitted to move vertically, within the limits of compression of the springs 59 and 60, and to move longitudinally of the locomotive within the limits of compression of the springs 16, while a pivotal point is provided about which the motor, driving axle and associated parts may swing horizontally with respect to the main frame of the locomotive. The pivotal point is also independent of the main frame of the locomotive, so that a comparatively great freedom of movement is permitted, without strain upon the locomotive parts. The end of the motor opposite the bearings 47 is further provided with a stirrup 64 that extends through a space which is provided between the bracket 63 and the motor 49, which stirrup serves to support the motor in case the suspension means becomes broken or injured.

From the description and the drawings, it will be apparent that the end driving axles and wheels are capable of horizontal movement with respect to the main frame, and that this movement occurs with practically no friction, though it is restrained by the springs 16. Further restraint and normal maintenance of the said parts in a central position with respect to the main frame is effected by means of centralizing springs 66.

All of the motors are resiliently supported, while the end motors are pivotally attached to parts other than the main frame in a manner that provides for greater freedom of movement of the motor than has heretofore been possible.

The connection of the extended upper end of the hanger rods 31 to the main frame of the locomotive, by means of the links 34, serves to prevent any unbalancing of the forces which act upon the semi-elliptic springs 30 and the journal boxes 18, and tending thereby to cause displacement of the said parts.

The lattice members 25 materially stiffen and strengthen the side members of the locomotive frame, and the provision of a saddle, that is attached thereto at the points of crossing, provides a simple and effective bearing for the equal beams.

I claim as my invention:

1. In a vehicle, the combination with a frame, of an axle, journal boxes thereon supporting said frame and adapted for movements in all directions with reference thereto, and resilient connections between the respective sides of said journal boxes and said frame.

2. In a vehicle, the combination with a frame, of an axle, journal boxes thereon supporting said frame and adapted for movements in all directions with reference thereto, and resilient connections between the respective sides of said journal boxes and said frame and independent of the frame supports.

3. In a vehicle, the combination with a frame, of an axle, journal boxes thereon supporting said frame and adapted for movements in all directions with reference thereto, and resilient means for connecting the respective sides of said journal boxes to said frame.

4. In a vehicle, the combination with a frame, of an axle, journal boxes thereon supporting said frame and adapted for movements in all directions with reference thereto, and helical springs interposed between said journal boxes and said frame and attached at their extremities thereto.

5. In a vehicle, the combination with a frame, of an axle, journal boxes thereon supporting said frame and adapted for movements in all directions with reference thereto, and resilient material interposed between and attached to said journal boxes and said frame.

6. A vehicle frame comprising upper and lower girders, lattice members extending between and connecting the girders, a bracket carried by the lattice members, and an equalizing member bearing on said bracket.

7. A vehicle frame comprising upper and lower girders, members extending vertically between and connected to the girders, lattice members connected to the said members and extending diagonally between them, a bracket carried by the lattice members, and an equalizing member bearing on said bracket.

8. A vehicle comprising a motor, an axle at one side of the motor and operatively connected thereto, a lug also at the opposite side of the motor, a box to which the said lug is pivotally connected, a bracket in which said box is movable, and means for resiliently supporting the motor.

9. A vehicle comprising a plurality of motors, axles respectively at one side thereof and operatively connected thereto, a lug at the opposite side of one of the motors, a box to which the said lug is pivotally connected, a bracket carried by the other motor in which the said box is guided, and means for resiliently supporting the motors.

10. A vehicle comprising a plurality of motors, axles respectively at one side thereof and operatively connected thereto, a lug also at the opposite side of one of the motors, a box to which the said lug is pivotally connected, a bracket carried by the other motor in which the said box is guided, and a stirrup attached to the motor having the lug, the stirrup extending through the said bracket.

11. A vehicle comprising a frame, an axle, journal boxes on the axle, suspension rods for supporting the frame upon the journal boxes, certain of said rods being extended and connected at both ends to the frame, and resilient connections between the frame and the sides of the journal boxes.

12. A vehicle pedestal comprising two side-by-side arched members, and plate members fastened to leg and foot portions of said arched members to hold them in rigid permanent relation.

13. A vehicle pedestal comprising two side-by-side sheet metal arched members having flanges projecting laterally from the planes of the arches, and plate members fastened to the leg and foot portions of the arched members to hold them in permanent rigid relation.

14. In a vehicle, the combination with an axle, journal boxes thereon, and a supporting frame operatively associated with said journal boxes and movable in all directions with reference thereto, of resilient means adapted to oppose said movement in horizontal and vertical directions.

15. In a vehicle, the combination with a frame, of an axle, journal boxes thereon for supporting said frame and having horizontal, vertical and transverse movements with reference thereto, and a plurality of springs respectively adapted to oppose the movements in said several directions.

16. In a vehicle, the combination with a frame, of an axle, journal boxes thereon for supporting said frame and adapted for movements in all directions with reference thereto, springs interposed between said frame and said boxes and adapted to support said frame, springs for horizontally centering said boxes, and springs for transversely centering said boxes with reference to said frame.

In testimony whereof, I have hereunto subscribed my name this 9th day of June, 1910.

GEORGE M. EATON.

Witnesses:
SAUL A. SIMMON,
B. B. HINES.